United States Patent [19]

Everson

[11] 4,044,351

[45] Aug. 23, 1977

[54] SYSTEM MONITOR WITH INNATE LINE SECURITY ABILITY

[75] Inventor: Evan Philip Everson, Cedar Rapids, Iowa

[73] Assignee: Walter Kidde & Company, Inc., Clifton, N.J.

[21] Appl. No.: 682,382

[22] Filed: May 3, 1976

Related U.S. Application Data

[63] Continuation of Ser. No. 482,231, June 24, 1974.

[51] Int. Cl.² ............... G08B 23/00; H04Q 9/00
[52] U.S. Cl. ................... 340/408; 340/152 T; 340/214
[58] Field of Search ........... 340/408, 409, 214, 213.2, 340/226, 213.1, 152 T, 151, 152 R; 343/6.5 R, 6.5 SS; 179/5 R, 2 A, 2 E, 2 TC; 325/64

[56] References Cited

U.S. PATENT DOCUMENTS

| | | | |
|---|---|---|---|
| 3,222,646 | 12/1965 | Hammer | 340/163 |
| 3,349,374 | 10/1967 | Gabrielson et al. | 340/163 |
| 3,426,348 | 2/1969 | Sadler | 340/408 |
| 3,713,142 | 1/1973 | Getchell | 340/408 |
| 3,757,035 | 9/1973 | Sullivan | 340/408 |
| 3,859,624 | 1/1975 | Kriofsky | 340/152 T |
| 3,967,984 | 10/1972 | Atkinson et al. | 340/408 |

Primary Examiner—John W. Caldwell
Assistant Examiner—James J. Groody
Attorney, Agent, or Firm—Haven E. Simmons; James C. Nemmers

[57] ABSTRACT

A system for monitoring a protected premises from a central station over telephone lines employs different audio tones sent back and forth over the lines. A random succession of audio tones from the central station interrogates the protected premises and is returned as a like succession of different tones to the central station where the latter tones are compared with the first to indicate a normal or a trouble condition at the protected premises or on the lines. When an alarm condition exists at the protected premises, still different tones are sent over the lines to cause an alarm alert at the central station. The entire system can be tested from the protected premises, including operation of the trouble and alarm circuits, without producing a trouble or an alarm alert at the central station.

12 Claims, 4 Drawing Figures

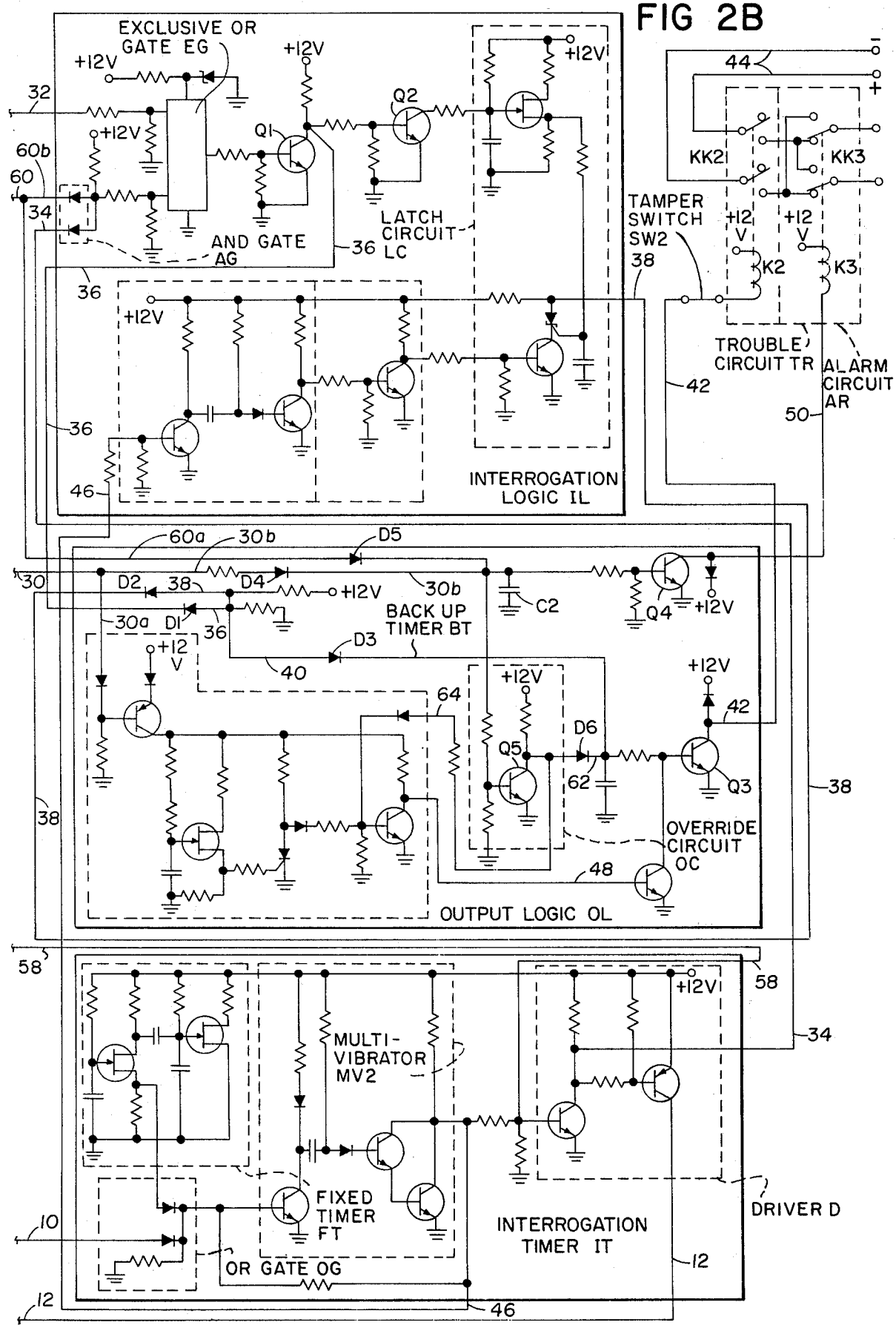

SYSTEM MONITOR WITH INNATE LINE SECURITY ABILITY

CROSS REFERENCE TO RELATED APPLICATION

This is a continuation of application Ser. No. 482,231, filed June 24, 1974.

BACKGROUND OF THE INVENTION

Systems for protecting premises or areas against improper intrusion have become widely used, particularly those which more or less continually monitor the premises or area from a remote location. The latter typically includes a police or central station which is tied to the monitored premises or area, a bank, for instance, by means of electrical cables such as a pair of telephone lines. Signals are sent from the central station to "interrogate" the premises or area which in turn sends back an appropriate signal to indicate its status. In the event trouble arises somewhere in the system or any tampering or improper intrusion should occur at the protected premises or area, a failure or change of the return signal to the central station activates a trouble indicator or an alarm.

To be fully adequate, the system must not only monitor the premises or area but itself as well. This is because, besides warning of trouble or failure of the system, it must also guard against attempts to subvert it by inducing false signals that all is well when in fact it is not. Subversion can be accomplished, for instance, by monitoring the connecting lines to note and record the nature of the response of the premises or area when interrogated and no trouble or alarm situation exists. A false signal of well being can then be insinuated into the lines in response to each interrogation and the connecting lines cut or the system at the premises or area otherwise disabled. Various methods to secure such systems against subversion are well known. Some include sending a mixture of signals to the premises or area, only some of which actually provide the interrogation while the remainder are decoys, the former being hidden amid the welter of the latter. Others interrogate only at random intervals, thus making it difficult if not impossible to provide a false return signal at the necessary times. Still others provide line security only as a manually instituted adjunct to the main system rather than as an innate, automatic part of it. The nature of the interrogation and response signals also varies, pulses being used in some cases and tones in others, though the former seem to predominate. Trouble and alarm conditions are often indicated by voltage or impedance changes on the connecting lines or by reversal of their polarity in the case of a DC line system. Many systems tend to be rather if not inordinately complex, particularly those in which signals to and from several premises at different locations are issued and monitored from a common complex of apparatus at the central station rather than by a separate or discrete installation for each location.

It is the primary object of the present invention, therefore, to provide a system of the nature and for the purposes described which is simpler and more reliable than many while at the same time providing complete security both for the premises or area to be protected as well as for the lines interconnecting the latter with the central station.

SUMMARY OF THE INVENTION

The system of the present invention relies essentially upon the transmission of audio tones back and forth over the connecting lines. At the central station, a timer produces a succession of pulses P1 at random time intervals, but at least one every 1½ minutes, which activate a transmitter T1 to provide a succession of audio tones of frequency F1 over the connecting or telephone lines. At the protected premises, the tones F1 enter a receiver R1 which produces a succession of pulses P2. The latter activate a second transmitter T2 at the protected premises which in turn sends a succession of audio tones of frequency F2 over the telephone lines to a receiver R2 at the central station. The latter receiver R2 produces a succession of pulses P3 which together with pulses P1 are applied to a logic complex. All the pulses P2 and P3 and the tones F1 and F2 have substantially the same intervals between them and are of the same durations as the pulses P1. Hence, if both pulses P1 and P3 are received at the logic complex all is well, but if pulses P1 and not pulses P3 are received or some other out of phase condition should occur, then a signal lamp and an audio alert is activated at the central premises to indicate trouble somewhere in the system, such as failure of some part or portion, or breakage or cutting of the telephone lines.

An alarm condition at the protected premises activates a transmitter T3 there which sends a constant audio tone of frequency F3 to a receiver R3 at the central station, the latter in turn energizing an alarm signal lamp and an audio alert. A test switch is also incorporated at the protected premises to check operation of the entire system. When closed, the test switch causes the system to interrogate the protected premises, the interrogation registering visually on a meter at the latter, in addition to normal interrogation from the timer at the central station.

Several features reside in the foregoing. First, the use of audio frequencies only over the telephone lines, instead of pulses, more readily fits the characteristics of those lines and their supporting equipment since, of course, they are designed for audio frequencies rather than pulses. Tones are also relied upon to provide trouble and alarm signals rather than changes in impedance or reversals of polarity on the telephone line. Second, not only does interrogation occur at wholly random intervals, thus innately producing line protection, but when interrogation occurs is determined wholly at the central station uninfluenced by any events at the protected premises. Hence, most of the time there is no signal of any kind on the telephone lines at all, making it extremely difficult for a potential intruder to pick out of a bundle of telephone lines those which in fact monitor the premises concerned. Third, an individual installation is employed at the central station for each protected premises, rather than a common complex into which all premises are tied. This both increases reliability as well as reduces cost and intricacy. In the same vein, owing to the reliance upon randomness, each installation is therefore necessarily unique and its various audio frequencies can be readily altered to differentiate it from other installations simply by adjusting the respective transmitters and receivers. The tolerances of the components are not critical and indeed contribute to the randomness and uniqueness of each installation. Thus there is no need to worry about integrating one system with others at the central station. Fourth, the ability to test operation of the system from the protected premises adds to the assurance and peace of mind of those who rely upon it. Furthermore, it is not necessary to warn the central station in advance that the system is being tested since that can be done without setting off a trouble or alarm alert at the central station (unless of course one of those conditions should actually exist at the moment of the test). Other and further features of the present invention will become apparent from the more detailed description which follows.

BRIEF DESCRIPTION OF THE DRAWINGS

FIGS. 2A and 2B are schematic diagrams of the circuitry at the central station.

DETAILED DESCRIPTION OF THE PREFERRED EMBODIMENT

Figure 2A:
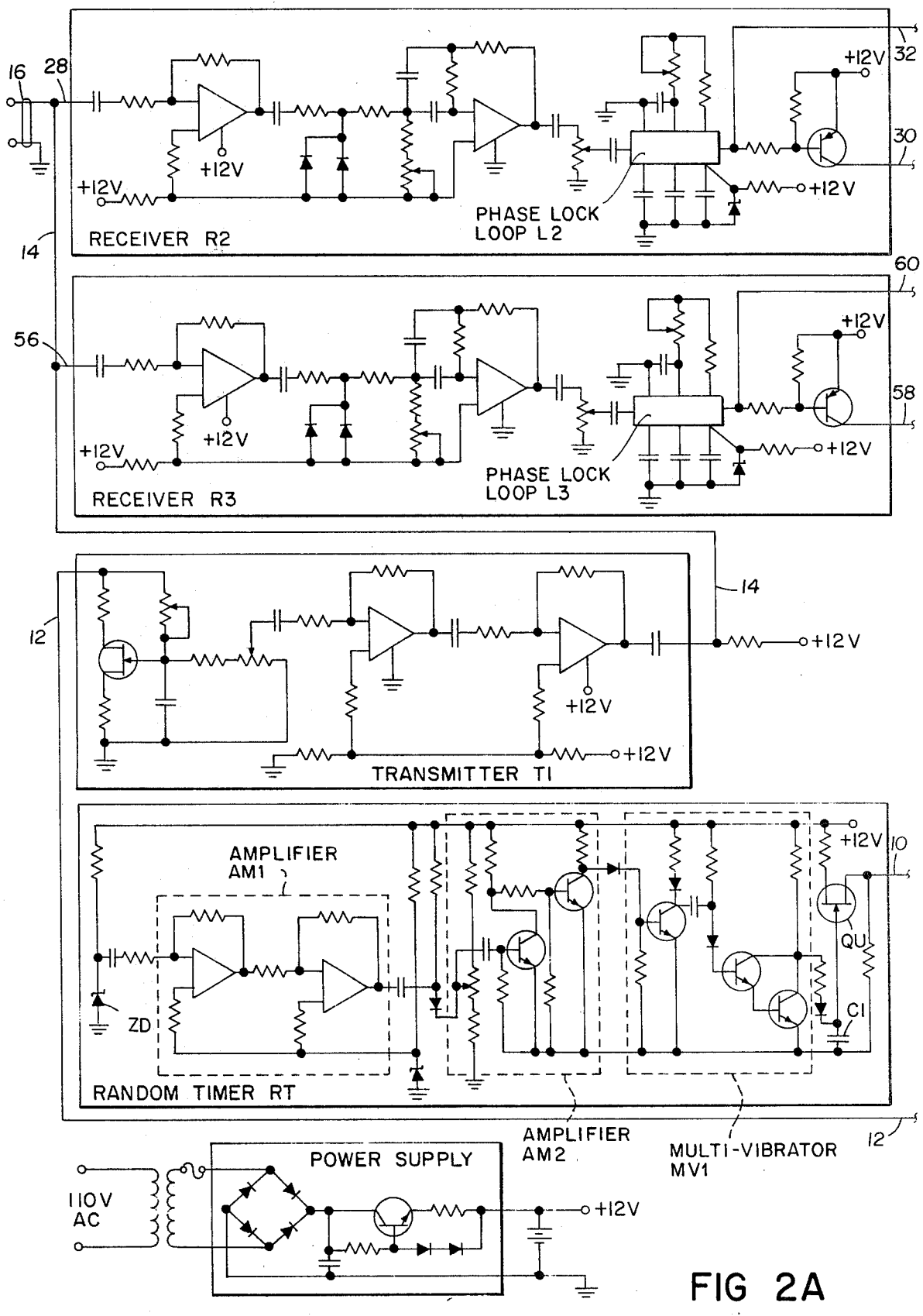
Figure 3:
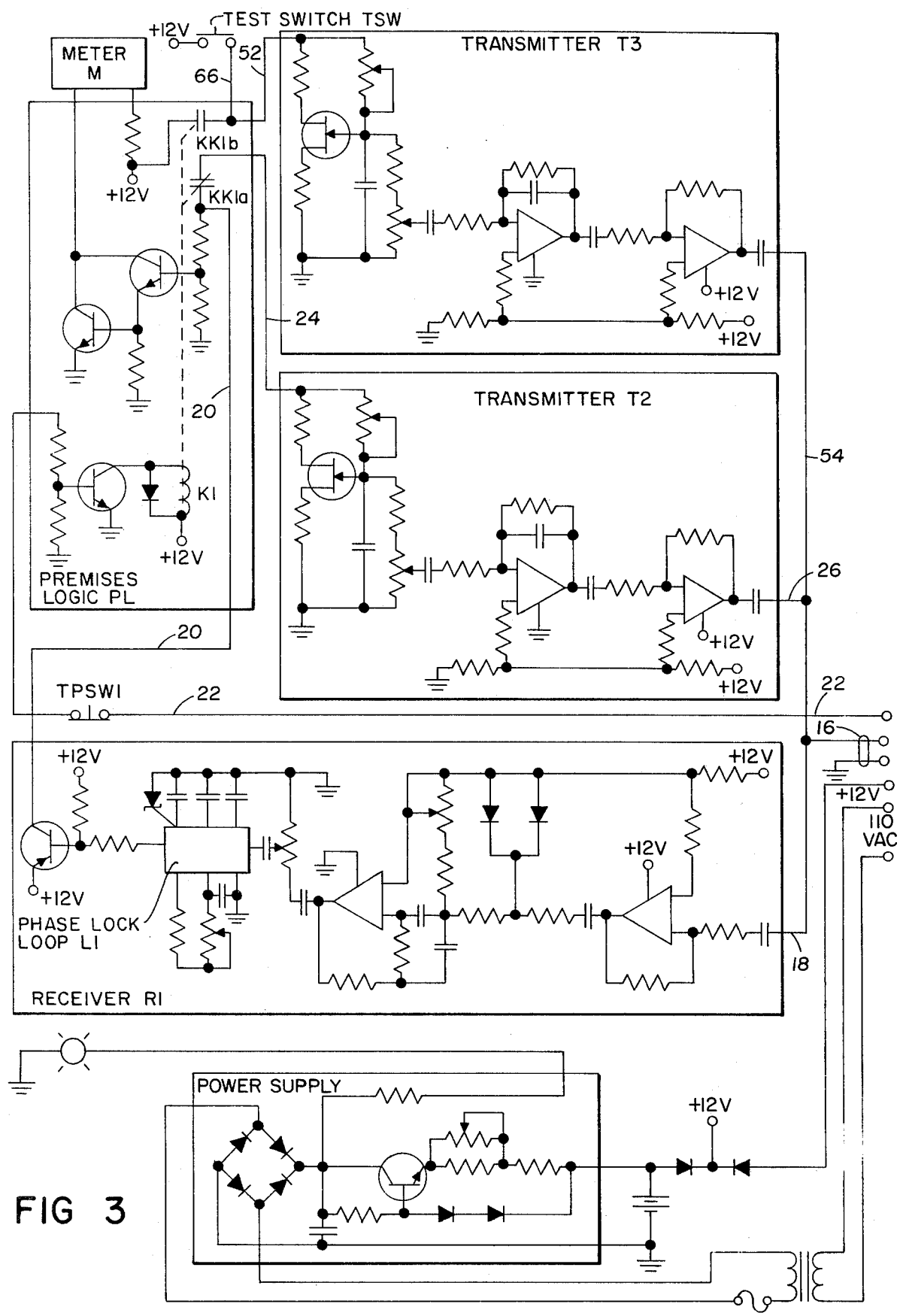
FIG. 3 is a schematic diagram of the circuitry at the protected premises.

As indicated, FIGS. 2A and 2B schematically illustrate the electronic circuitry located at the police or central station for each protected premises or area to be monitored. FIG. 3, on the other hand, schematically illustrates the electronic circuitry at the protected premises or area itself, the two being connected by telephone lines or equivalent means. Beginning first with FIGS. 2A and 2B, the randomness of the system is generated by a random timer RT in which a Zener diode ZD, biased for the "white noise" region, provides an AC signal of random amplitudes which is passed through an amplifier AM1 and "clipped" by an amplifier AM2 biased to produce a succession of discrete peaks or signals at random intervals. The latter are conditioned by a "single shot" multi-vibrator MV1 to produce a succession of uniform pulses of 30 millisecond duration each at the preceding random intervals which are accumulated in a capacitor C1 until sufficient to fire a uni-junction transistor QU whose output is led through a line 10 to the interrogation timer IT. Within the latter the random succession of pulses from the random timer RT are applied to an OR gate OG together with a succession of fixed pulses of 1½ minutes duration each from a fixed timer FT. The output of gate OG is sent to another "single shot" multi-vibrator MV2, which, regardless of the occasion of either set of pulses from the gate OG, provides a resulting succession of pulses of 5 second duration each, at random time intervals, which are conditioned by the driver D having two outputs. The first output, which is otherwise LO, provides a set of random HI interrogation pulses P1 while the second, which is otherwise HI, provides a corresponding set of LO interrogation pulses P'1. The fixed timer FT assures that there are a pair of interrogation pulses P1, P'1 of 5 second duration at least every 1½ minutes regardless of the interval between the random succession of pulses supplied through the line 10 from the random timer RT.

The pulses P1 are applied to a line 12 to activate a transmitter T1 at the central station whose output provides an AC signal or tone of frequency F1, which is within audio range, at the line 14 and thence over the telephone lines 16 to the protected premises where they are led through a line 18 to a receiver R1. The latter includes a phase lock loop L1, responsive only to the signals F1, to produce an output in the form of pulses P2 which are applied through a line 20 to the premises logic PL. Within the latter a relay K1 is energized through line 22 and suitable alarm contacts, for example, a switch (not shown), located at whatever is to be protected at the premises, a door, for instance. The relay K1 includes two sets of contacts KK1a and KK1b which are shown in their positions when the relay K1 is energized. The line 20 applies the pulses P2 to a meter M, in order to provide visual indication at the protected premises that the system is being interrogated, and through the closed contacts KK1a and a line 24 to a transmitter T2 which produces a different audio AC signal or tone of frequency F2. The tone F2 is applied through a line 26 to the telephone lines 16 and thence through a line 28 to a receiver R2 at the central station. The receiver R2 includes two outputs from a second phase lock loop L2. The first, which is otherwise LO, provides HI pulses P3 on a line 30 to the output logic OL for purposes to be described. At the same time the second output, which is otherwise HI, provides LO pulses P'3 through a line 32 to the first of two inputs to an exclusive OR gate EG in the interrogation logic IL whose output is LO if its two inputs are either both HI or both LO. The second input to the gate EG, as will be observed, is normally HI, and hence in the absence of pulses P'3 both inputs to the gate IG are HI so that its output is LO. However, the second input to the gate EG is influenced by an AND gate AG to which the pulses P'1 from the interrogation timer IT are applied through a line 34. Since both the pulses P'1 and P'3 are LO, both inputs to the gate EG also change from HI to LO so that the output of the gate EG continues LO. But if the pulses P'1 should be present at the gate EG but not the pulses P'3, the latter input would remain HI while the other input to the gate EG would change from HI to LO owing to the pulses P'1, whence the output of the gate EG would change from LO to HI to activate a signal indicating trouble somewhere in the system, for instance, the telephone lines 16 have been cut or are broken or something else is amiss elsewhere, etc., all as will now be described.

As long as the output of the gate EG is LO, the transistor Q1 in the interrogation logic IL is OFF and hence, as will be observed, a line 36 to a diode D1 in the output logic OL is HI. Meanwhile, as long as the line 36 is HI, a transistor Q2 in the interrogation logic IL is ON so that the output from a latch circuit LC controlled by the transistor Q2 is HI and applied through a line 38 to a diode D2 in the output logic OL. As will also be observed, as long as both lines 36 and 38 are HI, the output of a diode D3 remains HI and through a line 40 keeps a transistor Q3 ON. The latter completes a circuit through a line 42 to a trouble relay K2 in the trouble circuit TR to hold its two contacts KK2 in the position shown in FIG. 2B. Now, in the event the output of the gate EG in the interrogation logic IL should change from LO to HI owing to the absence of pulses P'3 and thus a trouble condition somewhere in the system, the transistor Q1 will be turned ON and so the line 36 changed from HI to LO. At the same time, the transistor Q2 will be turned OFF to change the output of the latch circuit LC in the line 38 also from HI to LO. Accordingly, both diodes D1 and D2 in the output logic OL will be LO and thus also the output of diode D3 in the line 40, turning OFF the transistor Q3 and opening the circuit to the trouble relay K2. Its contacts KK2 open the trouble circuit TR through the lines 44 to turn on an appropriate signal light and sound an alert (not shown). Since each pulse P'1 and P'3 is of relatively short duration, the output of the gate EG would return to LO once the interrogation was completed, since both inputs to the gate EG would return to HI until the next interrogation was attempted, whence the transistor Q1 would be turned ON again to restore power to the trouble relay K2 and turn off the trouble signal light and alert were it not for the latch circuit LC. In the event of trouble the output of the latter remains LO so that the line 38 and thus the output of diode D3 stay LO to keep the transistor Q3 OFF. Meanwhile, pulses from the interrogation timer IT corresponding to pulses P1 and P'1 are applied through a line 46 to an unlatch circuit UC in the interrogation logic IL. Once the trouble is corrected so that the output of the gate EG remains LO owing to the presentation of both pulses P'1 and P'3, the unlatch circuit UL, activated at the same time through the line 46, turns the latch circuit LC OFF to restore its output line 38 to HI.

A backup timer circuit BT is provided in the output logic OL so that should the interrogation timer IT fail, the output of the timer BT through a line 48 will turn OFF the transistor Q3 and deactivate the trouble relay K2 to give a "trouble" signal. The backup timer BT is designed to provide signals at fixed 2 minute intervals, that is, at greater intervals than those of the interrogation timer IT. Each signal from the latter, in the form of a pulse P3 from the receiver R2, is applied through a line 30a to reset the backup timer BT. Hence, as long as the timer IT interrogates at least every 1½ minutes, the timer BT never becomes operative upon the transistor Q3. At the same time, the pulses P3 are led through a line 30b and a diode D4 in the output logic OL to charge a capacitor C2 which is of sufficient size to maintain a transistor Q4 ON during the intervals between the pulses P3. The transistor Q4 keeps an alarm relay K3 in the alarm circuit AR energized through a line 50 to hold its contacts KK3 in the position illustrated in FIG. 2B.

Figure 1:
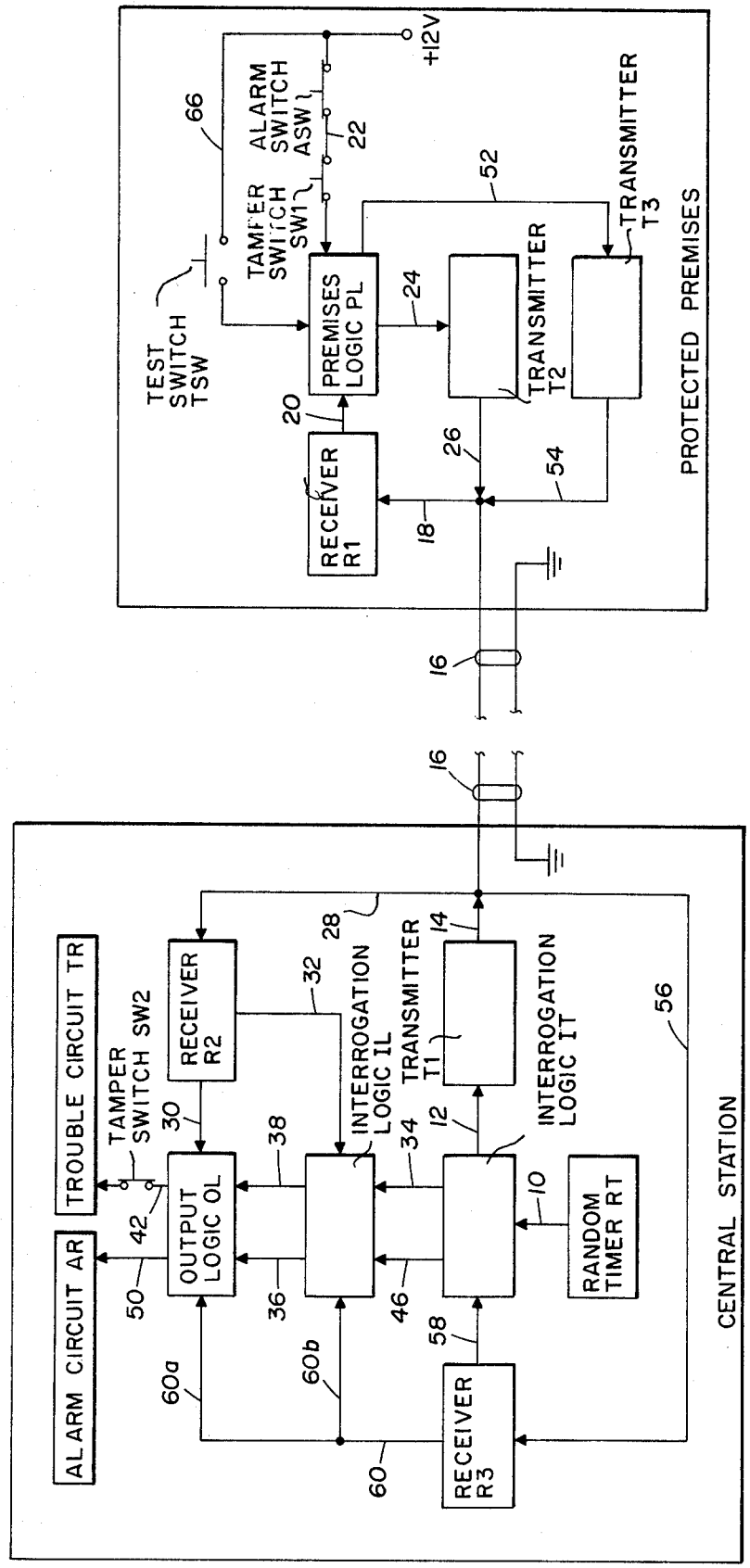
FIG. 1 is a block diagram indicating the relationship and logic of the components of the system of the present invention at both the central station and the protected premises.

Returning now to FIG. 3, in the event an alarm condition exists at the protected premises, power in the line 22 is interrupted by an alarm switch ASW (see FIG. 1), deactivating the relay K1 in the premises logic PL so that its contacts KK1a are opened and its contacts KK1b are closed. The latter contacts then complete a circuit through a line 52 to a transmitter T3 whose output in the form of a constant level AC signal or tone of audio frequency F3 is applied through a line 54 to the telephone lines 16 and at the central station to a receiver R3 through a line 56. The receiver R3 has two outputs, the first of which is normally LO and the second normally HI. When the tone F3 is received, the phase lock loop L3 of the receiver R3 provides a signal AS of constant level to the first output, changing it to HI, and a signal AS' of constant level to the second output, changing it to LO. The first signal AS is led through a line 58 to the input of the driver D of the interrogation timer IT and the second signal AS' through lines 60, 60a to the output logic OL and through lines 60, 60b to the interrogation logic IL. The signal AS overrides the interrogation timer IT and produces a constant level HI output AC in the line 12 and a constant LO output AC' in the line 34. The former output AC thus activates the transmitter T1 and in turn the receiver R1 at the protected premises but not the transmitter T2 owing to the open relay contacts KK1a in the premises logic PL. Hence, the output of the receiver R2 at the central station through line 32 to the gate EG in the interrogation logic IL remains HI. Since the same time both the output AC' through the line 34 and the output AS' through the lines 60, 60b are LO and applied to the gate AG, the latter changes to LO whereby the output of the gate EG would change to HI owing to the absence of LO pulses P'3 on the line 32 since receiver R2 is not activated. Hence the trouble circuit TR would be de-energized to drop out the trouble relay K2. However, the output AS' from the receiver R3 through the lines 60, 60a and a diode D5 in the output logic OL, since it is LO, turns OFF a transistor Q5 in an override circuit OC which in turn maintains transistor Q3 ON through a line 62 and a diode D6 and hence the trouble relay K2 energized. The override circuit OC also resets the backup timer BT through a line 64 in the output logic OL so that the absence of the pulses P3 on the line 30a will not cause the timer BT to affect the trouble relay K2. On the other hand, since the pulses P3 are not present on the line 30b, the capacitor C2 can thereafter no longer maintain the transistor Q4 ON, thus de-energizing the alarm relay K3 in the alarm circuit AR whereupon the contacts KK3 cause a reversal of polarity on the lines 44 to light a signal lamp and sound an appropriate alarm (not shown) at the central station. Tamper switches TPSW1 and TPSW2 are inserted into the line 22 at the protected premises and into the line 42 at the central station, respectively, and activated should the consoles of the system at either be disturbed. As will be apparent, when activated TPSW1 will cause an alarm alert by de-energizing the relay K1 and TPSW2 a trouble alert by de-energizing the relay K2.

A test switch TSW in a line 66 is also provided at the protected premises in order to check the operation of the system. As will be apparent from FIG. 3, when TSW is momentarily closed, transmitter T3 will be activated and hence receiver R3. The output TS of the latter through the line 58 produces a signal TP1 from the interrogation timer IT to activate transmitter T1 and receiver R1, the presence of the signal TP1 being indicated on the meter M at the premises logic PL. At the same time, transmitter T2 is activated and hence receiver R2 to provide a LO signal TP'3 through the line 32 to the gate EG in the interrogation logic IL. Since receiver R3 is activated, its output TS' through the lines 60, 60b is LO and is applied to the gate AG in the interrogation logic IL. Meanwhile, the output TP'1 from the interrogation timer IT through line 34 is also LO and applied to the gate AG. Hence the output of the gate EG remains LO and the trouble relay K2 energized so that no trouble signal is given. Owing to the fact that the output TP3 of the receiver R2 through the lines 30, 30b is HI, the transistor Q4 remains ON and the alarm relay K3 energized so that no alarm signal is given. Of course, should a trouble or an alarm condition happen to exist during a test, an appropriate signal would be given at the central station as will be obvious from the operation of the circuitry previously described.

It will be apparent that the durations of and the intervals between the pulses P2, P3 and P'3 and the tones T1 and T2 are all substantially the same as those of pulses P1 and P'1 in a particular installation. Should for some reason the former become out-of-phase with the latter a trouble condition would result owing to the action of the gate EG in the interrogation logic IL. Hence in a given installation the actual durations and spacing of the pulses P1 and P'1 are not critical, and of course durations and spacing other than those set forth above can be used. Nor need the output F3 of the transmitter T3 be of a constant level, i.e., of indefinite duration; a relatively short tone F3 plus a latching circuit would do just as well as the constant level to assure positive operation of the alarm circuit AR. Note that the transmitters T1, T2 and T3 are OFF unless a tone F1, F2 or F3 is actually being sent so that the telephone lines 16 have no signal upon them except at relatively momentary times. Hence there would be great difficulty picking them out of a large bundle of otherwise ordinary telephone lines. As indicated in FIG. 2A, the power supply for the circuitry at the central station is primarily by means of a battery which is maintained by a typical trickle charger, while as indicated in FIG. 3 at the protected premises power is supplied from a battery pack plus a backup battery also maintained by a trickle charger.

As will be observed also, the system for each protected premises is complete in and of itself and is not dependent upon or otherwise integrated with that for any other protected premises. Besides the savings in cost and complexity and the consequent increase in reliability, the independence of each system assures its uniqueness to which the non-critical aspect of its components contributes. Each system is also readily adjustable within itself, by means of the potentiometers illustrated, to provide whatever frequencies F1, F2 and F3 may be desired and so to differentiate it from all other systems of like nature. At the central station, it will be understood of course, that the trouble and alarm indicators for all the various premises being monitored would normally be displayed together on a single panel and appropriately labeled for each premises. Other details of the circuitry and its operation will be apparent to those skilled in the art who will also be readily able to determine the appropriate values and specifications of the components involved for particular installations of the system. Finally, even though the present invention has been described in terms of a particular embodiment, being a best mode known of carrying out the invention, it is not limited to that embodiment alone. Instead, the following claims are to be read as encompassing all adaptations and modifications of the invention falling within its spirit and scope.

I claim:

1. A system for monitoring a protected premises from a central station including apparatus for location at the protected premises and apparatus for location at the central station and for interconnection by electrical lines, the central apparatus comprising generating means for generating first pulses at random time intervals, first transmitter means responsive to said first pulses for generating first tones having a first frequency at sequential intervals substantially contemporaneous with those of said first pulses and of substantially like durations and for transmitting said first tones over the lines to the premises apparatus; the premises apparatus comprising premises logic means, first receiver means for receiving said first tones and providing second pulses to said premises logic means at sequential intervals substantially contemporaneous with those of said first pulses and of substantially like durations, second transmitter means operatively connected to said first receiver means through said premises logic means and responsive to said second pulses for generating second tones having a second frequency different from that of said first tones but at sequential intervals substantially contemporaneous with those of said first pulses and of like durations and for transmitting said second tones over the lines to the central apparatus substantially simultaneously with the transmission thereover of said first tones; the central apparatus further comprising second receiver means for receiving said second tones and providing third pulses at sequential intervals substantially contemporaenous with those of said first pulses and of substantially like durations, central logic means operatively connected to said generating means and said second receiver means for ascertaining the presence or not of both said first and said third pulses at the central apparatus at substantially contemporaneous times; the premises apparatus still further comprising a first alarm circuit responsive to an alarm condition at the protected premises, the first alarm circuit including said premises logic means and third transmitter means for generating a third tone having a third frequency different from those of said first and second tones, said premises logic means operatively disconnecting said first receiving means from said second transmitting means and activating said third transmitter in the event of said condition, said third transmitter means transmitting said third tone over the lines to the central apparatus substantially simultaneously with the transmission thereover of said first tones to the premises apparatus; the central apparatus still further comprising a second alarm circuit including third receiver means for receiving said third tone.

2. The system of claim 1 wherein said first, second and third transmitter means provide no signals on the lines except when activated as aforesaid.

3. The system of claim 2 wherein a trouble condition is defined by the presence at said central logic means of one of said first pulses but not contemporaneously one of said third pulses and causes a central logic means output change from normal to abnormal, and including a trouble circuit responsive to said change, said trouble circuit having a latch circuit operatively connected to said central logic means for maintaining said central logic means output change in the event of a trouble condition and an unlatch circuit operatively connected to said latch circuit and said generating means for returning said central logic means to normal upon disappearance of said trouble condition.

4. The system of claim 3 wherein said trouble circuit includes means responsive to said central logic means output change to provide indication thereof.

5. The system of claim 3 wherein said premises logic means includes first alarm switch means activated by an alarm condition at the protected premises, said first alarm switch means in one position providing said disconnection of said first receiver means from said second transmitter means and activation of said third transmitter means to provide said third tone, said third tone being a constant signal as long as said first alarm switch is in said position.

6. The system of claim 5 wherein said third receiver means in response to said third tone applies a constant signal to said central logic means and to said generating means to activate said first transmitter means and thereby also causes said central logic means output change from normal to abnormal, said second alarm circuit being responsive to said central logic means output change.

7. The system of claim 6 including an override circuit operatively connected with said third receiver means and said trouble circuit to override the aforesaid effect of said central logic means output change upon said trouble circuit in the event of an alarm condition.

8. The system of claim 7 wherein said second alarm circuit includes means responsive to said central logic means output change to provide indication thereof.

9. The system of claim 8 wherein the premises apparatus includes test switch means effective to activate said third transmitter means to provide said third tone without operatively disconnecting said first receiver means from said second transmitter means, said third receiver means applying said third tone to said central logic means and to said generating means to activate said first transmitter means and said first receiver means and thereby said second transmitter means and said second receiver means.

10. The system of claim 9 wherein the premises apparatus includes means to provide visual indication of said second pulses provided by said first receiver means.

11. The system of claim 3 wherein said generating means comprises random timer means providing pulses at random time intervals, and fixed timer means providing pulses at fixed time intervals, said random pulses and said fixed pulses being combined to provide uniform pulses of equal durations at random time intervals but at least at intervals equal to those of said fixed pulses, said uniform pulses constituting said first pulses.

12. The system of claim 11 where the central apparatus includes backup timer means effective to provide backup pulses at greater intervals than those of said first pulses, said backup timer means being operatively connected to said trouble circuit and to said second receiver means to receiver said third pulses from said second receiver means, said backup timer means providing said backup pulses to said trouble circuit in the event none of said third pulses are received by said backup timer means from said second receiver means.

* * * * *